United States Patent
Lin et al.

(10) Patent No.: US 8,204,096 B2
(45) Date of Patent: Jun. 19, 2012

(54) AUTOMATIC FREQUENCY HOPPING METHOD FOR USE WITH WIRELESS DEVICE

(75) Inventors: Chien-Nan Lin, Taipei (TW); Chin-Lung Lai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 495 days.

(21) Appl. No.: 12/504,762

(22) Filed: Jul. 17, 2009

(65) Prior Publication Data

US 2010/0296548 A1    Nov. 25, 2010

(30) Foreign Application Priority Data

May 22, 2009 (TW) ................................ 98116989 A

(51) Int. Cl.
*H04B 1/00* (2006.01)
*H04W 4/00* (2009.01)
*H04M 1/00* (2006.01)
*H04M 1/64* (2006.01)

(52) U.S. Cl. ...... 375/136; 455/462; 455/561; 379/88.17
(58) Field of Classification Search .................. 375/136, 375/346

See application file for complete search history.

(56) References Cited

U.S. PATENT DOCUMENTS

| | | | |
|---|---|---|---|
| 2001/0050945 A1* | 12/2001 | Lindsey | 375/132 |
| 2002/0071508 A1* | 6/2002 | Takada et al. | 375/346 |
| 2002/0098870 A1* | 7/2002 | Kashiwagi et al. | 455/561 |
| 2002/0196912 A1* | 12/2002 | Norris | 379/88.17 |
| 2003/0224741 A1* | 12/2003 | Sugar et al. | 455/115.1 |
| 2004/0023674 A1* | 2/2004 | Miller | 455/462 |
| 2004/0047324 A1* | 3/2004 | Diener | 370/338 |
| 2006/0093018 A1* | 5/2006 | Chi | 375/136 |
| 2008/0247375 A1* | 10/2008 | Muharemovic et al. | 370/344 |
| 2009/0213902 A1* | 8/2009 | Jeng | 375/133 |

* cited by examiner

*Primary Examiner* — David C. Payne
*Assistant Examiner* — Sarah Hassan
(74) *Attorney, Agent, or Firm* — Kirton McConkie; Evan R. Witt

(57) ABSTRACT

An automatic frequency hopping method is provided for use with a wireless device. The wireless device could transmit data in two or more communication frequency bands. According to the counts of successful data transmission in respective communication frequency bands, the reasons of communication failure are analyzed. According to the reasons of communication failure, the automatic frequency hopping method discriminates whether a frequency hopping procedure is performed. Since the frequency hopping procedure is performed when a proper frequency hopping condition is satisfied, the automatic frequency hopping method could achieve the power-saving purpose and avoid the wireless communication interference with other wireless devices.

9 Claims, 3 Drawing Sheets

AUTOMATIC FREQUENCY HOPPING METHOD FOR USE WITH WIRELESS DEVICE

FIELD OF THE INVENTION

The present invention relates to an automatic frequency hopping method, and more particularly to an automatic frequency hopping method for use with a wireless device.

BACKGROUND OF THE INVENTION

With rapid development of scientific and information industries and in views of convenience, wireless communication technologies are gradually used in more and more electronic devices of our daily lives. During the operation of a wireless electronic device, the wire linkage is exempted and thus the troublesome process of managing the connecting wire is avoided. In addition, the wireless electronic device could be operated at any place that is within the wireless network coverage area. The most popular wireless electronic devices are wireless computer peripheral devices such as wireless mice, wireless keyboards, wireless presentation remote controllers or wireless microphones.

In the practical applications of the wireless computer peripheral devices, the automatic frequency hopping methods are very important. Due to many factors, if the signal emitting terminal and the signal receiving terminal of a wireless computer peripheral device fail to perform wireless communication in the current communication frequency band, the wireless communication between the signal emitting terminal and the signal receiving terminal should be performed in another communication frequency band. The process of switching the current communication frequency band to another communication frequency band is also referred as a frequency hopping procedure. An inferior frequency hopping procedure causes a slow frequency hopping rate of the wireless computer peripheral device. As such, a communication failure problem between the signal emitting terminal and the signal receiving terminal occurs. Under this circumstance, the user fails to normally input data. On the other hand, if the frequency hopping procedure between the signal emitting terminal and the signal receiving terminal is frequently done, the residual battery capacity of the wireless computer peripheral device will be consumed quickly. Since a lot of frequency hopping signals occupy much space, the wireless communication interference with other wireless devices will be possibly created.

Generally, the frequency hopping procedure is performed when the communication between the signal emitting terminal and the signal receiving terminal is failed. However, there are some reasons of communication failure. For some reasons of communication failure, the communication quality is improved by the frequency hopping procedure. For some other reasons of communication failure, the communication quality fails to be improved by the frequency hopping procedure.

FIG. 1A is a schematic diagram illustrating the generation of wireless communication interference according to a conventional wireless transmission technology. As shown in FIG. 1A, the signal receiving terminal 120 is located within the effective communication range of the signal emitting terminal 110. In a case that one or more wireless electronic devices 130 are located in the vicinity of the signal emitting terminal 110 and the signal receiving terminal 120, the current frequency band for communicating the signal emitting terminal 110 with the signal receiving terminal 120 will be switched to another frequency band in order to improve the communication quality.

FIG. 1B is a schematic diagram illustrating the generation of wireless communication interference according to another conventional wireless transmission technology. As shown in FIG. 1B, the signal receiving terminal 120 is located beyond the effective communication range of the signal emitting terminal 110, or the residual battery capacity of the signal emitting terminal 110 is insufficient to provide enough power to emit wireless signals. Even if the current frequency band for communicating the signal emitting terminal 110 with the signal receiving terminal 120 is switched to another frequency band, the wireless signals fail to be transmitted from the signal emitting terminal 110 to the signal receiving terminal 120. Under this circumstance, the frequency hopping procedure fails to enhance the communication quality and the power consumption of the battery is increased. Moreover, if the frequency hopping procedure between the signal emitting terminal 110 and the signal receiving terminal 120 is frequently done, the communication of other wireless electronic devices within the effective communication range of the signal emitting terminal 110 will be interfered.

Therefore, there is a need of providing an improved automatic frequency hopping method for analyzing the reasons of communication failure and adaptively activating the frequency hopping operation is performed according to the reasons of communication failure, thereby enhancing the communication quality, reducing power consumption and avoiding the wireless communication interference with other wireless devices.

SUMMARY OF THE INVENTION

It is an object of the present invention to provide an automatic frequency hopping method for use with a wireless device, thereby analyzing the reasons of communication failure and discriminating whether a frequency hopping operation is performed according to the reasons of communication failure.

Another object of the present invention provides an automatic frequency hopping method for use with a wireless device, in which the wireless device could transmit data in two or more communication frequency bands and thus the successful rate of data transmission is increased.

In accordance with an aspect of the present invention, there is provided an automatic frequency hopping method for use between a wireless input device and a wireless transceiver. The automatic frequency hopping method includes the following steps. Firstly, the wireless input device is allowed to transmit a data to the wireless transceiver in a first communication frequency band, wherein the first communication frequency band has a first transmission parameter. Then, the first transmission parameter is updated a according to a first result of transmitting the data in the first communication frequency band. Then, the automatic frequency hopping method includes a step of discriminating whether the wireless input device is allowed to transmit the data to the wireless transceiver in a second communication frequency band according to the first result, wherein the second communication frequency band has a second transmission parameter. Then, the second transmission parameter is updated according to a second result of transmitting the data in the second communication frequency band. Afterwards, according to the first transmission parameter, the second transmission parameter or a relative ratio between the first transmission parameter and the second transmission parameter, the automatic frequency hopping method discriminates whether a frequency hopping procedure is required to be performed.

In an embodiment, the first communication frequency band and the second communication frequency band have the same number of sub-frequency bands.

In an embodiment, the frequency hopping procedure includes steps of: allowing the wireless transceiver to transmit a flag data in the second communication frequency band, wherein the flag data includes a sub-frequency band indexing value, allowing the wireless input device to receive the flag signal in the second communication frequency band, and performing data transmission between the wireless input device and the wireless transceiver in sub-frequency bands of the first communication frequency band and the second communication frequency band corresponding to the sub-frequency band indexing value.

In an embodiment, the first result of transmitting the data in the first communication frequency band indicates a successful transmission parameter or a failed transmission parameter.

In an embodiment, a specified value is added to the first transmission parameter if the first result of transmitting the data in the first communication frequency band indicates the successful transmission parameter.

In an embodiment, the wireless input device is allowed to transmit the data to the wireless transceiver in the second communication frequency band if the first result of transmitting the data in the first communication frequency band indicates the failed transmission parameter.

In an embodiment, the second result of transmitting the data in the second communication frequency band indicates a successful transmission parameter or a failed transmission parameter.

In an embodiment, a specified value is added to the second transmission parameter if the second result of transmitting the data in the second communication frequency band indicates the successful transmission parameter.

In an embodiment, the frequency hopping procedure is performed when the first transmission parameter is greater than a first threshold value.

In an embodiment, the frequency hopping procedure is performed when the second transmission parameter is greater than a second threshold value.

In an embodiment, the frequency hopping procedure is performed when the relative ratio between the first transmission parameter and the second transmission parameter is greater than a third threshold value.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an automatic frequency hopping method for use with a wireless device. The reasons of communication failure are firstly analyzed. According to the reasons of communication failure, automatic frequency hopping method discriminates whether a frequency hopping procedure needs to be performed or not. Accord to the automatic frequency hopping method of the present invention, the wireless device could transmit data in two or more communication frequency bands. As such, the successful rate of data transmission is increased.

Figure 1A:
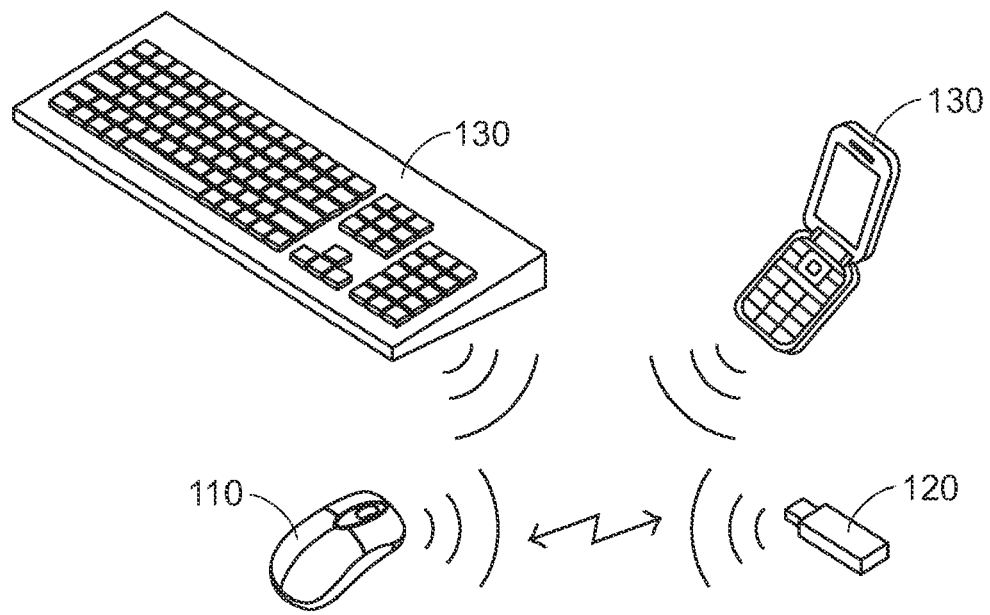
FIG. 1A is a schematic diagram illustrating the generation of wireless communication interference according to a conventional wireless transmission technology.
Figure 1B:
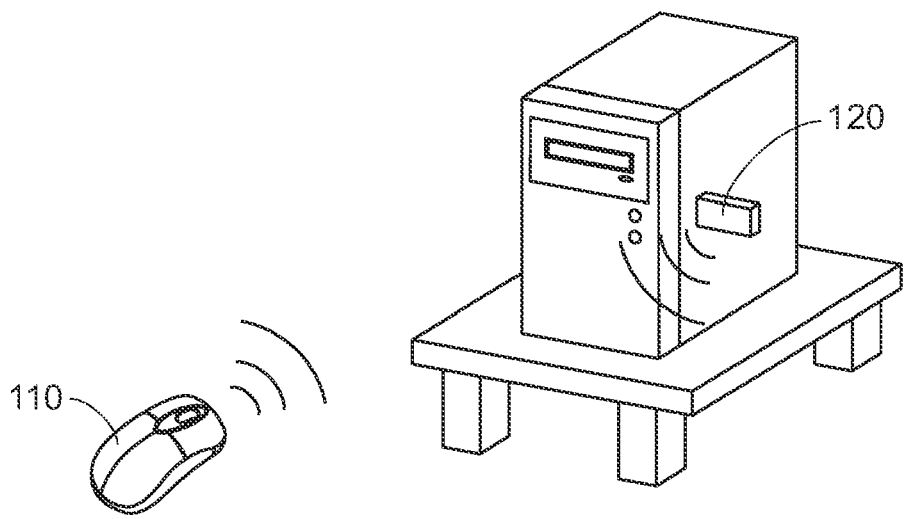
FIG. 1B is a schematic diagram illustrating the generation of wireless communication interference according to another conventional wireless transmission technology.
Figure 2:
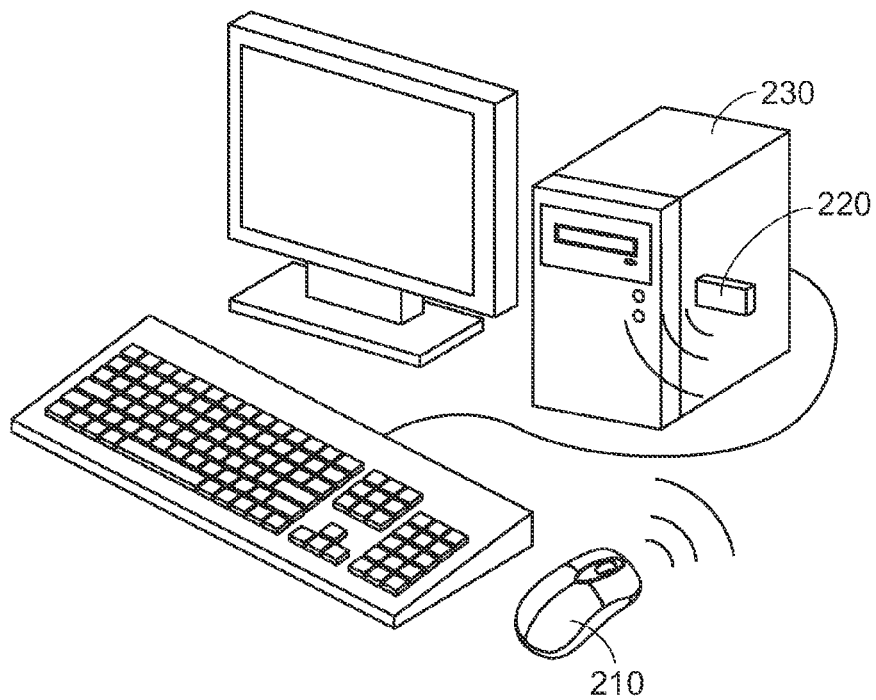
FIG. 2 is a schematic diagram illustrating a wireless communication system including a wireless device and host computer according to an embodiment of the present invention.

FIG. 2 is a schematic diagram illustrating a wireless communication system including a wireless device and host computer according to an embodiment of the present invention. In an embodiment, the wireless device is a wireless computer peripheral device such as a wireless mouse. The wireless mouse includes a wireless input device 210 and a wireless transceiver 220. During the operation of the wireless communication system, the wireless transceiver 220 is electrically connected with a host computer 230. The data inputted via the wireless input device 210 will be transmitted according to a wireless transmission technology such as a radio frequency transmission technology or an infrared transmission technology. After the data are received by the wireless transceiver 220, the data will be transmitted to the host computer 230 in order to achieve the wireless remote controlling purpose.

Figure 3:
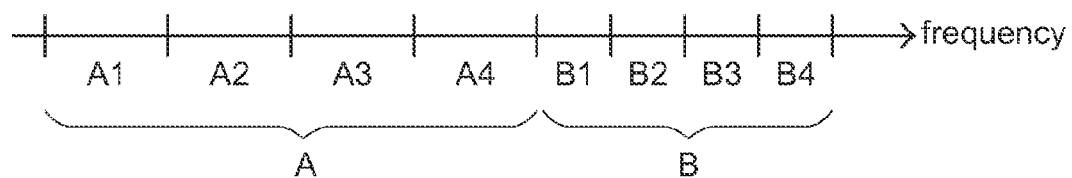
FIG. 3 is a schematic diagram illustrating the frequency spread spectrum according to the present invention.

For increasing the successful rate of data transmission, two or more communication frequency bands are employed for communicating the wireless input device 210 with the wireless transceiver 220. FIG. 3 is a schematic diagram illustrating the frequency spread spectrum according to the present invention. The frequency-hopping spread spectrum includes a first communication frequency band A and a second communication frequency band B. The first communication frequency band A and the second communication frequency band B have the same numbers of sub-frequency bands. For example, the first communication frequency band A includes four sub-frequency bands A1, A2, A3 and A4; and the second communication frequency band B includes four sub-frequency bands B1, B2, B3 and B4. The sub-frequency bands have respective sub-frequency band indexing values. For example, the sub-frequency bands A1 and B1 have the same sub-frequency band indexing value; the sub-frequency bands A2 and B2 have the same sub-frequency band indexing value, the sub-frequency bands A3 and B3 have the same sub-frequency band indexing value; and the sub-frequency bands A4 and B4 have the same sub-frequency band indexing value.

As previously described, if one or more wireless electronic devices are located in the vicinity of the wireless input device 210 and the wireless transceiver 220, if the wireless input device 210 is located beyond the effective communication range of the wireless transceiver 220 or if the residual battery capacity of the wireless input device 210 is insufficient, the problems of causing wireless communication interference of the wireless device occur. For solving the above drawbacks, two or more communication frequency bands are employed to transmit data according to the automatic frequency hopping method of the present invention. In accordance with an embodiment of the present invention, two communication frequency bands having the same sub-frequency band indexing value are employed to transmit data. For example, these two communication frequency bands are respectively the first sub-frequency band of the first communication frequency band and the first sub-frequency band of the second communication frequency band. Alternatively, these two communication frequency bands are respectively the second sub-frequency band of the first communication frequency band and the second sub-frequency band of the second communication frequency band.

In a case that a communication failure occurs when a current communication frequency band (e.g. the first sub-frequency band of the first communication frequency band) is employed to transmit data, the current communication frequency band will be switched to another communication frequency band (e.g. the first sub-frequency band of the second communication frequency band) that is separated from the current communication frequency band by a specified frequency band. If the communication failure in the current communication frequency band frequently happens but another communication frequency band is successful, it is meant that the wireless communication interference caused by the neighboring electronic devices is only generated when the current communication frequency band is employed to transmit data but no wireless communication interference is generated when another communication frequency band is employed to transmit data. For avoiding frequent occurrence of the wireless communication interference, a frequency hopping procedure needs to be done if a specified condition is satisfied. After the frequency hopping procedure is performed, the first sub-frequency bands of the first and second communication frequency bands will be switched to the second sub-frequency bands of the first and second communication frequency bands. As such, the communication interference caused by the neighboring electronic devices in the first sub-frequency band will be avoided.

In accordance with an embodiment of the present invention, the counts of the successful data transmission in the current communication frequency band are accumulated as a first transmission parameter. In addition, the counts of the successful data transmission in another communication frequency band are accumulated as a second transmission parameter. A predetermined judgment criterion is used to discriminate whether the frequency hopping procedure needs to be done. For example, if the first transmission parameter is greater than a first threshold value, the second transmission parameter is greater than a second threshold value or a relative ratio between the first transmission parameter and the second transmission parameter is greater than a third threshold value, the frequency hooping procedure needs to be done.

In a case that the communication failure in the current communication frequency band occurs and the communication failure in another communication frequency band occur, it is inferred that the wireless device is beyond the effective communication range or the residual battery capacity is insufficient to provide enough power to emit wireless signals. That is, in addition to the communication frequency band, there are some other reasons of communication failure. If the communication failure is resulted from the residual battery capacity, the frequency hopping procedure needs to be avoided in order to achieve the power-saving purpose. Moreover, since the counts of the successful data transmission in the first communication frequency band are accumulated as the first transmission parameter and the counts of the successful data transmission in the second communication frequency band are accumulated as the second transmission parameter, the discrimination of the frequency hopping procedure has nothing to do with the communication failure in the current communication frequency band and another communication frequency band.

Figure 4:
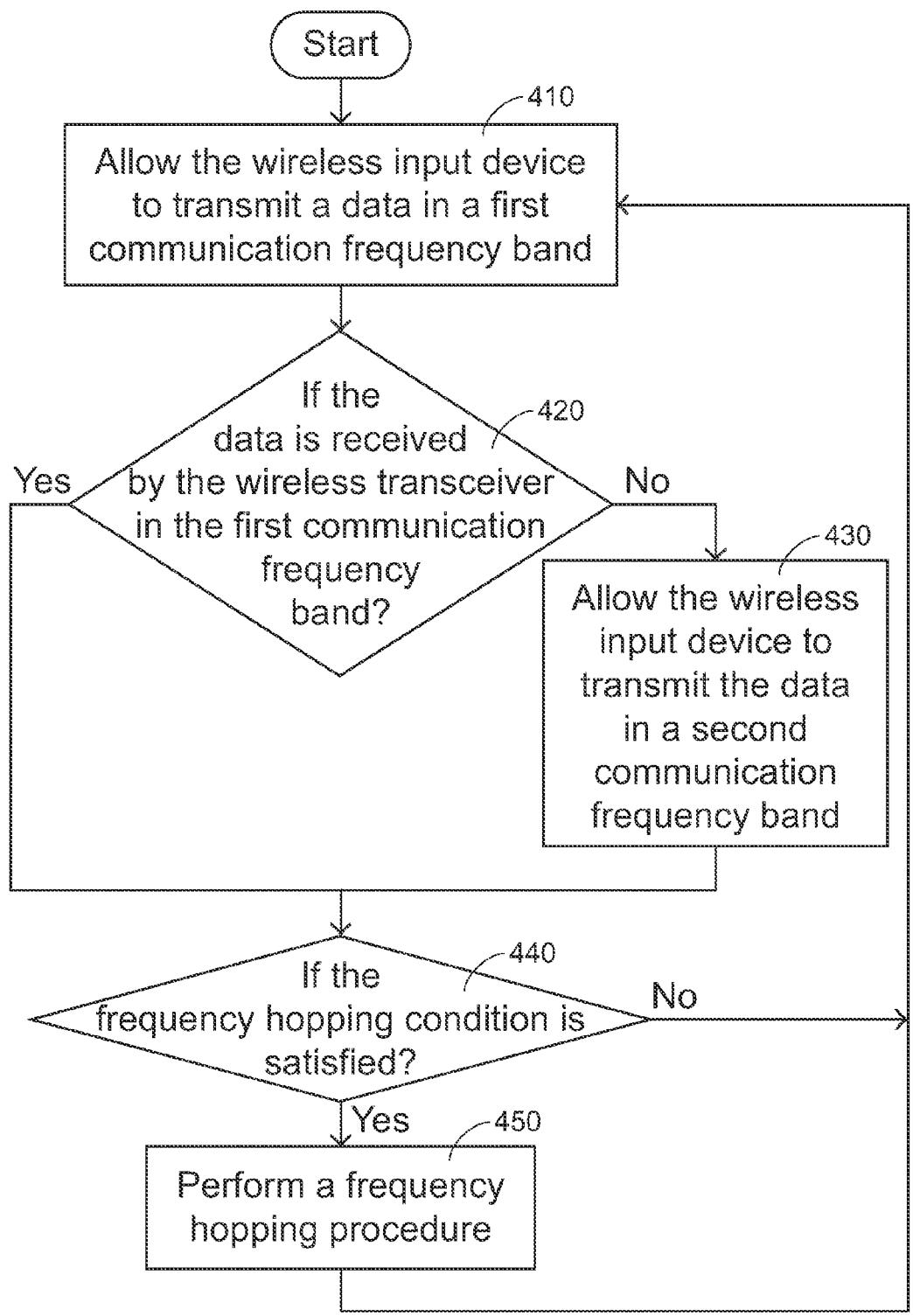
FIG. 4 is a flowchart illustrating an automatic frequency hopping method according to an embodiment of the present invention.

FIG. 4 is a flowchart illustrating an automatic frequency hopping method according to an embodiment of the present invention. First of all, the wireless input device is allowed to transmit a data to the wireless transceiver in a first communication frequency band, wherein the first communication frequency band has a first transmission parameter (Step 410). In particular, the wireless input device is allowed to transmit the data in a specified sub-frequency band of the first communication frequency band. Next, the automatic frequency hopping method discriminates if the data is received by the wireless transceiver in the first communication frequency band, in particular by the specified sub-frequency band of the first communication frequency band (Step 420). Once the data is successfully received by the wireless transceiver in the first communication frequency band, the Step 440 is performed and a specified value is added to the first transmission parameter. Whereas, once the data is not received by the wireless transceiver in the first communication frequency band, the Step 430 is performed.

In the Step 430, the wireless input device is allowed to transmit the data in a sub-frequency band of a second communication frequency band that has the same sub-frequency band indexing value as the specified sub-frequency band of the first communication frequency band. The second communication frequency band has a second transmission parameter. Once the data is successfully received by the wireless transceiver in the second communication frequency band, a specified value is added to the second transmission parameter.

In the Step 440, a predetermined judgment criterion is used to discriminate whether the frequency hooping condition is satisfied. For example, the frequency hooping condition is satisfied when the first transmission parameter is greater than a first threshold value. Alternatively, the frequency hooping condition is satisfied when the second transmission parameter is greater than a second threshold value. Alternatively, the frequency hooping condition is satisfied when a relative ratio between the first transmission parameter and the second transmission parameter is greater than a third threshold value. That is, if the frequency hooping condition is not satisfied, the Step 410 is performed again in order to transmit the next data. Whereas, if the frequency hooping condition is satisfied, the Step 450 is performed.

In the Step 450, a frequency hooping procedure is performed. The frequency hopping procedure includes three steps of: (1) allowing the wireless transceiver to transmit a flag data in the second communication frequency band, wherein the flag data includes a sub-frequency band indexing value that is distinguished from the index value of the current sub-frequency band; (2) allowing the wireless input device to receive the flag signal in the second communication frequency band; and (3) performing data transmission between the wireless input device and the wireless transceiver in sub-frequency bands of the first communication frequency band and the second communication frequency band corresponding to the sub-frequency band indexing value.

From the above description, the automatic frequency hopping method of the present invention is capable of analyzing the communication failure reasons (e.g. communication interference caused by other electronic devices, beyond the effective communication range or insufficient battery capacity to provide enough power to emit wireless signals) according to the counts of the successful data transmission in sub-frequency bands of the first communication frequency band and the second communication frequency band. Depending on the communication failure reasons, the frequency hopping procedure is adaptively performed. Since the frequency hopping procedure is performed when a proper frequency hopping condition is satisfied, the automatic frequency hopping method could achieve the power-saving purpose and avoid the wireless communication interference with other wireless devices. Moreover, if the data fails to be received by the wireless transceiver in a specified sub-frequency band of the first communication frequency band, the wireless input device is allowed to re-transmit the data in a sub-frequency band of a second communication frequency band that has the same sub-frequency band indexing value as the specified sub-frequency band of the first communication frequency band. In other words, the automatic frequency hopping method of the present invention has a better protective mechanism of data transmission in comparison with the conventional technology, thereby effectively enhancing the wireless communication quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic frequency hopping method for use between a wireless input device and a wireless transceiver, said automatic frequency hopping method comprising steps of:
   (1) allowing said wireless input device to transmit a data to said wireless transceiver in a first communication frequency band, wherein said first communication frequency band has a first transmission parameter;
   (2) updating said first transmission parameter according to a first result of transmitting said data in said first communication frequency band in said step (1);
   (3) discriminating whether said wireless input device is allowed to transmit said data to said wireless transceiver in a second communication frequency band according to said first result, wherein said second communication frequency band has a second transmission parameter, wherein said first communication frequency band and said second communication frequency band have the same number of sub-frequency bands;
   (4) updating said second transmission parameter according to a second result of transmitting said data in said second communication frequency band in said step (3); and
   (5) discriminating whether a frequency hopping procedure is required to be performed according to said first transmission parameter, said second transmission parameter or a relative ratio between said first transmission parameter and said second transmission parameter,
   wherein said frequency hopping procedure comprises steps of:
   allowing said wireless transceiver to transmit a flag data in said second communication frequency band, wherein said flag data includes a sub-frequency band indexing value;
   allowing said wireless input device to receive said flag signal in said second communication frequency band; and
   performing data transmission between said wireless input device and said wireless transceiver in sub-frequency bands of said first communication frequency band and said second communication frequency band corresponding to said sub-frequency band indexing value.

2. The automatic frequency hopping method according to claim 1 wherein said first result of transmitting said data in said first communication frequency band indicates a successful transmission parameter or a failed transmission parameter.

3. An automatic frequency hopping method for use between a wireless input device and a wireless transceiver, said automatic frequency hopping method comprising steps of:
   (1) allowing said wireless input device to transmit a data to said wireless transceiver in a first communication frequency band, wherein said first communication frequency band has a first transmission parameter;
   (2) updating said first transmission parameter according to a first result of transmitting said data in said first communication frequency band in said step (1), wherein said first result of transmitting said data in said first communication frequency band indicates a successful transmission parameter or a failed transmission parameter wherein a specified value is added to said first transmission parameter if said first result of transmitting said data in said first communication frequency band indicates said successful transmission parameter;
   (3) discriminating whether said wireless input device is allowed to transmit said data to said wireless transceiver in a second communication frequency band according to said first result, wherein said second communication frequency band has a second transmission parameter;
   (4) updating said second transmission parameter according to a second result of transmitting said data in said second communication frequency band in said step (3); and
   (5) discriminating whether a frequency hopping procedure is required to be performed according to said first transmission parameter, said second transmission parameter or a relative ratio between said first transmission parameter and said second transmission parameter.

4. The automatic frequency hopping method according to claim 2 wherein said wireless input device is allowed to transmit said data to said wireless transceiver in second communication frequency band if said first result of transmitting said data in said first communication frequency band indicates said failed transmission parameter.

5. The automatic frequency hopping method according to claim 2 wherein said second result of transmitting said data in said second communication frequency band indicates a successful transmission parameter or a failed transmission parameter.

6. The automatic frequency hopping method according to claim 5 wherein a specified value is added to said second transmission parameter if said second result of transmitting said data in said second communication frequency band indicates said successful transmission parameter.

7. The automatic frequency hopping method according to claim 1 wherein said frequency hopping procedure is performed when said first transmission parameter is greater than a first threshold value.

8. The automatic frequency hopping method according to claim 1 wherein said frequency hopping procedure is performed when said second transmission parameter is greater than a second threshold value.

9. An automatic frequency hopping method for use between a wireless input device and a wireless transceiver, said automatic frequency hopping method comprising steps of:
   (1) allowing said wireless input device to transmit a data to said wireless transceiver in a first communication frequency band, wherein said first communication frequency band has a first transmission parameter;

(2) updating said first transmission parameter according to a first result of transmitting said data in said first communication frequency band in said step (1);
(3) discriminating whether said wireless input device is allowed to transmit said data to said wireless transceiver in a second communication frequency band according to said first result, wherein said second communication frequency band has a second transmission parameter;
(4) updating said second transmission parameter according to a second result of transmitting said data in said second communication frequency band in said step (3); and
(5) discriminating whether a frequency hopping procedure is required to be performed according to said first transmission parameter, said second transmission parameter or a relative ratio between said first transmission parameter and said second transmission parameter wherein said frequency hopping procedure is performed when said relative ratio between said first transmission parameter and said second transmission parameter is greater than a third threshold value.

* * * * *